United States Patent [19]
Saito et al.

[11] Patent Number: 4,613,044
[45] Date of Patent: Sep. 23, 1986

[54] COMPACT DISC CASE

[75] Inventors: Ikuo Saito, Kamakura; Ryosuke Minakata, Yao; Yukio Suzuki, Hatano, all of Japan

[73] Assignees: Nikkodo Co., Ltd., Osaka; Marantz Japan Inc., Kanagawa, both of Japan

[21] Appl. No.: 684,607

[22] Filed: Dec. 21, 1984

[51] Int. Cl.4 .............................................. B65D 85/30
[52] U.S. Cl. ..................................... 206/444; 360/133
[58] Field of Search ................... 206/444; 360/133, 86; 369/291

[56] References Cited

U.S. PATENT DOCUMENTS

| | | | |
|---|---|---|---|
| 4,084,690 | 4/1978 | Pulse | 206/444 |
| 4,208,117 | 6/1980 | Harvey et al. | 206/444 |
| 4,436,201 | 3/1984 | Inaba | 206/444 |
| 4,463,849 | 8/1984 | Prusak et al. | 206/444 |
| 4,471,397 | 9/1984 | Cloutier | 206/444 |
| 4,476,978 | 10/1984 | Saito | 206/444 |

*Primary Examiner*—Joseph Man-Fu Moy

*Attorney, Agent, or Firm*—Koda and Androlia

[57] ABSTRACT

A compact disc case including lower and upper cases fixed by snap joints with enough space left in between for storing a compact disc. The lower case has at least three cushion holders to support the compact disc up above the bottom, and for preventing improper insertion of the case into a disc player, a control groove or a control shell is provided at least in either one of the upper and lower cases. The front edge wall of the lower case is provided with engagement holes, while the upper case has pawls to be engaged with the engagement holes, and also latches and latch locks engaging with each other are formed at the rear of the upper and lower cases. By means of this structure, the case with a compact disc in it can be inserted into a disc player for use without any improper insertion, and since the upper and lower cases can be readily detached from each other, the disc can be taken out and cleaned easily when the information-recording side gets dirty due to long periods of use or by accident.

6 Claims, 5 Drawing Figures

COMPACT DISC CASE

BACKGROUND OF THE INVENTION

1. Field of the Invention

The present invention relates to a compact disc case, and more particularly to a case for storing a compact disc, about 12 cm in diameter with one of its sides storing information to be read out in a form of various intensities of reflected light of laser beam, in order to prevent the compact disc from getting stained when the compact disc is not in use and also to ensure the highly stable movement of the compact disc during its use.

2. Prior Art

Compact discs which have been used conventionally are formed relatively well resistant to dirt and dust and can be held with one hand by pinching it. Therefore, the compact discs are put into or taken out of disc players as they are naked upon use. Consequently, the existing cases for the discs are designed only for storage purposes.

Because of these circumstances, the disc surfaces are liked to be soiled with dust, dirt, fingerprints, etc., and to remove such stains, for example, expensive cleaners made of specifically processed natural leathers have to be used. Also, since the compact disc is handled without protecting cover, serious accidents, such as that the compact disc is damaged to become of no use may frequently occur.

SUMMARY OF THE INVENTION

The object of the present invention is to provide a compact disc case that keeps a compact disc stored in stable condition while protecting the disc from becoming dirty when it is not used and allows the disc to be played with high stability while kept in the case.

Another object of the present invention is to provide a compact disc case that is constructed to be opened easily for cleaning the information-recorded surface of the compact disc when it is soiled due a long period of use or by accident.

In keeping with the principles of this invention, the objects of this invention are accomplished by a unique structure for a compact disc case including a lower case and an upper case, the lower case and the upper case being fixed together with a space therebetween so that a compact disc can be rotatably placed in the space. The lower case includes a through hole provided at the center, engagement holes formed on the front wall of the lower case, latch locks provided at the rear ends of the side walls of the lower case and at least three cushion holders provided on the bottom of the lower case, the holders being around a position where the compact disc is placed. Each one of the cushion holders includes a holding piece and a cushion pad, the holding piece being formed to stand on the bottom of the lower case, and the cushion pad, provided with a support pad substantially the same height as the space between the upper case and the lower case. The cushion pad is mounted on the holding piece so that the top surface of the pad is above the upper edge level of the lower case, and the support pad is located inside the disc placement position. The upper case includes an opening formed at the center and engagement pawls formed on the front edge of the upper case. The engagement pawls engage with the engagement holes of the lower case. Latches, formed at the rear ends of both sides of the upper case, are snapped to engage with the latch locks formed in the lower case. The compact disc case further includes a guide means provided in at least one of the upper and lower cases for preventing erroneous placement of the compact disc case in a disc player.

DETAILED DESCRIPTION OF THE INVENTION

Figure 1:
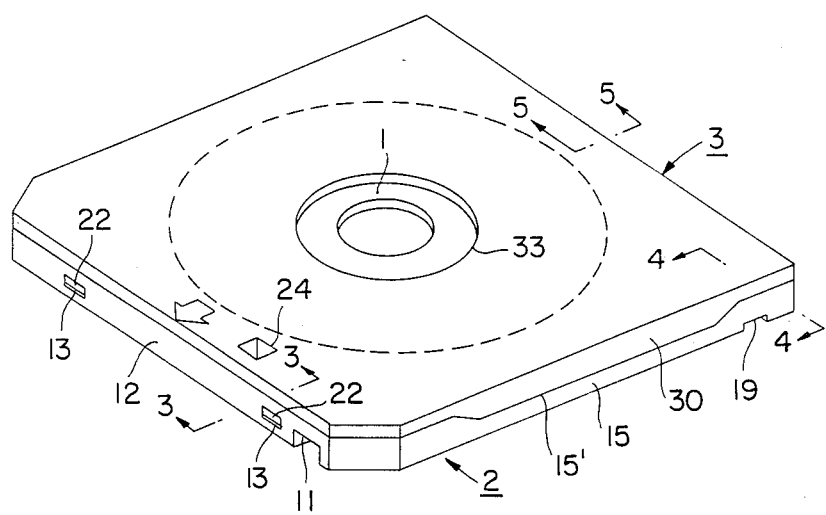
FIG. 1 is a perspective view of a compact disc case of an embodiment according to the present invention.
Figure 2:
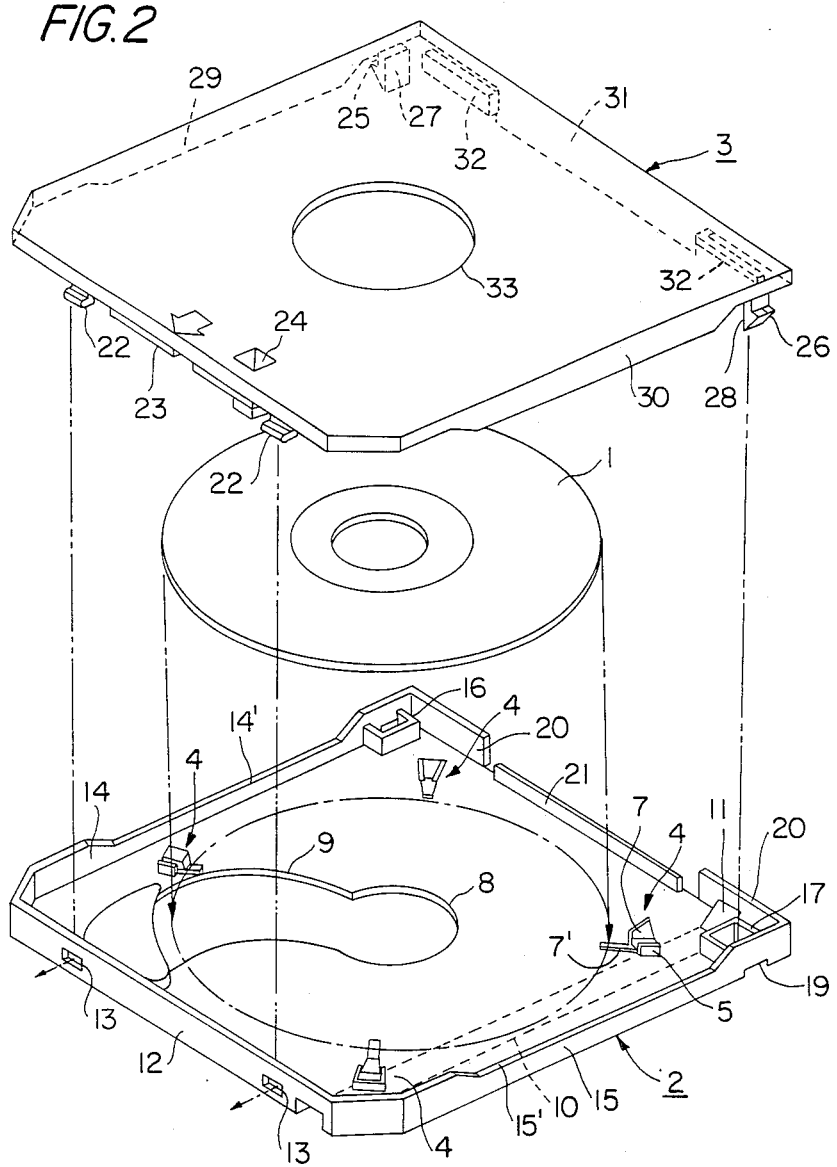
FIG. 2 is an exploded perspective view of FIG. 1.

As should be apparent from FIGS. 1 and 2, a compact disc case of this invention includes a lower case 2 and an upper case 3. These cases are fixed together with a compact disc 1 inside.

At four locations near the outer edges of the compact disc setting position on the lower case 2, indicated by a dot line in FIG. 2, cushion holders 4 for holding the compact disc 1 at the specified position are disposed respectively facing the center.

Figure 4:
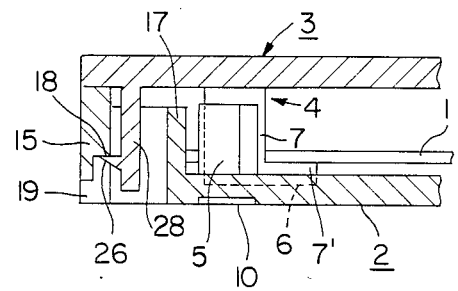
FIG. 4 is a sectional view taken along the line 4—4 in FIG. 1.

Each of the cushion holders 4 is formed of a holding piece 5 and a cushion pad 7. The holding piece 5 is substantially a U-shape in its plan view and placed in the hole 6 to stand straight up on the upper surface of the lower case 2. The cushion pad 7, made of soft material, is fitted into the holding piece which is, as mentioned, set in the holes 6 as shown in FIG. 4. Furthermore, the cushion pad 7 is provided with a support pad 7' that is extended toward the center of the lower case 2. The tip of the support pad 7' locates inside the compact disc setting position shown by a dot line. The support pad 7' is designed such that the upper surface of the pad is slightly above the upper surface level of the wall of the lower case 2. The compact disc will be placed on the pad 7'.

A through hole 8 for inserting the turntable spindle of a disc player is formed at the center of the lower case 2 and an arcuate read out window 9 is formed continuously from the through hole 8. This read out window 9 allows an optical read out device of the disc player to operate.

In addition, the bottom of the lower case 2 is provided with a groove 10 formed along one side of the case. The groove 10 functions as a guide for preventing the compact disc case from being inserted into the player upside down by mistake. As the front end and the back end of this groove 10 are formed guiding ramps 11. These ramps 11 guide the protruding portion of a player into the groove 10 when the protruding portion of the player is brought into contact with the groove 10 and to slide along the groove 10.

Along the edges of the lower case 2 are wall which are provided with various kinds of fitting means for effecting fixation of the upper case 3.

First, on the front wall 12, two engagement holes 13 are formed, while at the rear ends of the side walls 14 and 15, small rectangular tube shaped latch locks 16 and 17 are formed. These latch locks 16 and 17 include the side walls 14 and 15 as respective component parts. As shown in FIG. 4, an engaging step portion 18 is formed on the inner surface of each one of the side walls 14 and 15 forming, as a part, the latch locks 16 and 17 as mentioned above. Under each of the engaging step portions 18 is formed a release hole 19 used for releasing engagement.

Further, both of the side walls 14 and 15 are formed with cutouts 14' and 15' at their center areas. The rear wall includes rear end walls 20, a central inner wall 21 and spaces therebetween. The inner wall 21 is positioned slightly inside of the rear end walls 20.

Next, a description will be given of the upper case 3.

Figure 3:
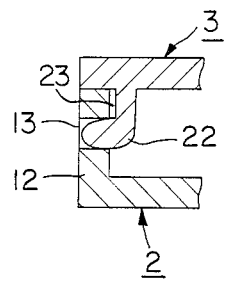
FIG. 3 is a sectional view taken along the line 3—3 in FIG. 1.

At locations corresponding respectively to the engagement holes 13 on the front wall 12 of the lower case 2, engagement pawls 22 are suspended. The hooking portion at the tip of the engagement pawls 22 is formed into a semicircular shape in cross section as shown in FIG. 3, so that it can be engaged with the engagement hole 13 while it is rotated. Between these two engagement pawls 22, a holding piece 23 to be fitted to the inner surface of the front wall 12 of the lower case 2 is formed. A small rectangular tube shaped control shell 24 is provided near the holding piece 23. At the rear ends of both sides which correspond to the latch locks 16 and 17 of the lower case 2, latches 27 and 28 having engaging hooks 25 and 26 at their lower ends are formed in a hanging manner.

The upper case 3, formed in a single plate in form, is to be laid and overlapped the peripheral walls of the lower case 2. Vertical walls 29 and 30 are formed on both the right and left sides of the upper case 3 so that they fit the cutouts 14' and 15' of the side walls 14 and 15 of the lower case 2.

At the rear is a window wall 31 which is integrally suspended at the center of the rear edge. Rear edge inner walls 32 are formed on both sides of this window wall 31 with small spaces left between the window wall 31. These rear edge inner walls 32 are located slightly inside of the window wall 31 so that the walls 32 fit respectively to the inner surfaces of the rear edge walls 20 of the lower case 2.

Figure 5:
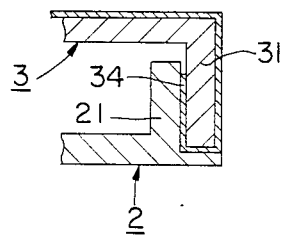
FIG. 5 is a sectional view taken along the line 5—5 in FIG. 1.

Furthermore, an opening 33 for allowing the clamper of the player to operate is formed at the center area. Reference numeral 34 in FIG. 5 is a label showing the title of music, etc. recorded on the compact disc 1.

The above mentioned compact disc case is assembled as follows: The compact disc 1, with the information-recorded side facing down, is brought to the position marked with a dotted line on the lower case 2 as seen in FIG. 2, and laid on the support pads 7' of the four cushion pads 7. Then, the upper case 3 is plced over and fixed to the lower case 2.

The steps are as follows: First, both of the engagement pawls 22 are positioned to face the engagement holes 13, respectively, and the upper case 3 is pushed down to turn around. The engagement pawls 22 are inserted into the engagement holes 13 as shown in FIG. 3. At the same time, both of the latches 27 and 28 are inserted into the latch locks 16 and 17. Then, the upper case 3 is further pressed down with slight pressure so that both latches 27 and 28 are pressed down while slidingly kept contacting with the inner surfaces of the sides wall 14 and 15. After a while, each these latches 27 and 28 engages with the engaging stepped portions 18 by means of its engaging hook 25 and 26 as shown in FIG. 4. In this manner, the upper case 3 and the lower case 2 are fixed together with the compact disc 1 stored between them.

In the case mentioned above, as shown in FIG. 5, the label 34 is held securely between the central inner wall 21 of the lower case 2 and the transparent window wall 31 of the upper case 3 so that the label 34 can be seen from outside through the window wall 31.

At the front, the holding piece 23 of the upper case 3 comes into contact with the inner surface of the front wall 12 of the lower case 2, while on the rear side, the rear edge inner walls 32 of the case upper case 3 are fitted to the inner surfaces of the rear end walls 20 of the lower case 2. Furthermore, the vertical walls 29 and 30 on both sides of the upper case 3 overlap with the upper edge of the cutouts 14' and 15' of the sides walls 14 and 15 of the lower case 2.

This way, the upper case 3 and the lower case 2 are mutually fixed securely overlapping without causing any backlash. As shown in FIG. 4, the compact disc 1 is held in such a manner that it is held above the bottom of the lower case 2 by means of the support pads 7' of the cushion pads 7. Therefore, the information-recorded side of the compact disc 1 is free room dust and possible damage.

The compact disc case mentioned above with the compact disc 1 inside can be inserted as it is into the disc player when it is to be used. Specifically, when the compact disc case is placed on a specified position of the player, the carrier of the player inserts itself into the control shell 24 and moves the case to a specified position in the player. Then, when the case is placed in a depressed portion that is provided at this specified position for setting the case, the spindle of the turntable passes through the hole 8 into the center hole of the compact disc 1 to support the compact disc 1. As a result, the compact disc 1 is a floating state above the support pads 7' of the respective cushion pads 7. At the same time, the clamper goes down and clings securely to the spindle after passing through the opening 33. Thus, the compact disc 1 is held between this clamper and the spindle, and the compact disc 1 is turned by the spindle.

The compact disc 1 contains information on only one of its two sides, and usually this inormation-recorded sides facing down when the compact disc 1 is set in a disc player. Consequently, if the compact disc 1 is inserted upside down, the results are undesirable. In order to avoid such mishandling, the case has a control groove 10 in the lower case 2 and the control shell 24 in the upper case 3, respectively forming a double control structure. For operating these controlling mechanisms, the player is provided with a movable projection engaging with the control groove 10 to guide the compact case. The player is also provided with a carrier to be inserted into the control shell 24 in order to move the compact disc case.

By means of these controlling means, when the compact disc case cannot be inserted properly the control groove 10 and the control shell 24, as another means for control, does not come into the proper position so that the through hole 8 and the opening 33 are unaffected by such improper handling. In this way the compact disc 1 is protected.

When the information-recorded side of the compact disc 1 gets dirty due to a long period of use or by accident, the compact disc 1 is taken out of the case to be cleaned and thereafter the compact disc 1 is returned to the case again. For removing the compact disc 1, the upper case 3 is detached from the lower case 2. With, for example, a hard straight tool, one of the latches 27 and 28 is pressed in to cause a slight deformation to it. By this operation, the engaging hook 25 or 26 is released from the engaging stepped portion 18, and also, the latch 27 or 28 comes off the latch lock 16 or 17. This, in turn, enables the other counterpart latch 27 or 28 to disengaged easily. Thereafter, the rear portion of the upper case 3 is lifted so that the engagement pawls 22 turn within the engagement holes 13 causing the engagement pawls 22 to come out of the engagement holes 13. As a result, the upper case 3 is separated from the lower case 2.

The description above is for the embodiment provided with four cushion holders 4. However, the same results as shown in the aforementioned embodiment can be obtained as long as the cushion holders 4 are provided at least three in number.

As should be apparent from the foregoing description, the compact disc case of this invention can store a compact disc without causing any damage to it through the use of a plurality of cushion holders. Besides, the compact disc stored in the case can be inserted into a disc player as it is in the case, and it can be driven to rotate as it is without causing any trouble. Therefore, the compact disc can be protected from being soiled with dirt and dust as well as from being damaged. Also, it is not necessary any more to put the disc in and out of the case every time the disc is played. Thus, the compact disc case of this invention provides remarkable effects in actual use.

In addition, since the lower case and the upper case are so constructed that they can be detached easily, if the information-recorded side of the compact disc is contaminated due to a long period of use or by accident, etc., the compact disc can be cleaned easily as the disc can simply by removed from the case. Furthermore, as preventative means are provided by incorporating the controlling mechanisms, the operation of the disc player does not start if the compact disc case is inserted into the player improperly. Thus, the compact disc can be protected from mishandling. Moreover, by utilizing the peripheral walls formed for combining the upper case with the lower case with a certain gap left in between, it is possible to hold the label showing the contents of the information recorded on the compact disc by inserting the label into the foregoing gap. This way, the label can be held securely without slipping off. With this structure, the label holding portion with decent appearance can be formed without increasing the manufacturer's cost.

We claim:

1. A compact disc case comprising a lower case and an upper case, the lower case and the upper case being fixed together with a space therebetween so that a compact disc can be rotatably placed in the space, wherein:
   the lower case comprises:
      a through hole provided at the center;
      engagement holes formed on the front wall of the lower case;
      latch locks provided at the rear ends of the side walls of the lower case; and
      at least three cushion holders provided on the bottom of the lower case, the holders being around a position where the compact disc is placed, and each one of the cushion holders comprising a holding piece and a cushion pad;
      the holding piece being formed to stand on the bottom of the lower case; and
      the cushion pad, provided with a support pad and substantially the same height as the space between the upper case and the lower case, being mounted on the holding piece so that the top surface of the pad is above the upper edge level of the lower case and the support pad located inside the disc placement position,
   the upper case comprises:
      an opening formed at the center;
      engagement pawls formed on the front edge of the upper case, the engagement pawls engaging with the engagement holes of the lower case; and
      latches formed at the rear ends of both sides of the upper case, the latches being snapped to engage with the latch locks of the lower case; and
   a guide means provided in at least one of the upper and lower cases for preventing erroneous placement of the compact disc case in a disc player.

2. A compact disc case according to claim 1, wherein four cushion holders are provided on diagonal lines crossing the disc placement position in the lower case.

3. A compact disc case according to claim 1, wherein the guide means comprises a control groove formed on the undersurface of the lower case along its one side wall and a control shell formed at the front portion of the upper case.

4. A compact disc case according to claim 1, wherein each of the latch locks of the lower case is a small rectangular tube shaped engagement shell comprising:
   the side wall of the lower case;
   an engaging step portion formed on the inner surface of the side wall; and
   a release hole formed under the step portion, and
   each of the latches formed on the upper case is provided with an engaging hook so as to engage with the engaging step portion of the latch lock of the lower case, the latch being in a form suspended from the upper case at the location corresponding to the position of the latch lock formed on the lower case.

5. A compact disc case according to claim 1, wherein:
   a rear wall of the lower case comprises:
      a central inner wall formed slightly inside of the rear edge of the lower case; and
      rear end walls formed at both sides of the central wall along the rear edge of the lower case; and
   a rear wall of the upper case comprises:
      a transparent window wall formed at the center of the rear edge of the upper case; and
      rear edge inner walls formed at both sides of the transparent window wall, the rear edge inner walls being slightly inside of the window wall to contact the rear end walls of the lower case;
   so that the center inner wall of the lower case and the transparent window wall of the upper case form a label holding portion between them.

6. A compact disc case according to claim 1, wherein the tips of the engagement pawls of the upper case are formed semicircular in cross section so that the engagement pawls can be engaged with the engagement holes of the lower case by rotating the pawls in the engagement holes.

* * * * *